United States Patent [19]

Callander et al.

[11] E Patent Number: Re. 32,765

[45] Reissued Date of Patent: Oct. 11, 1988

[54] HIGH CLARITY COLORLESS POLYESTERS

[75] Inventors: Douglas D. Callander, Akron; Fred L. Massey, Uniontown, both of Ohio

[73] Assignee: The Goodyear Tire & Rubber Company, Akron, Ohio

[21] Appl. No.: 14,739

[22] Filed: Feb. 13, 1987

Related U.S. Patent Documents

Reissue of:

[64] Patent No.: 4,499,226
Issued: Feb. 12, 1985
Appl. No.: 454,753
Filed: Dec. 30, 1982

U.S. Applications:

[63] Continuation of Ser. No. 245,838, Mar. 20, 1981.

[51] Int. Cl.[4] ..... C08K 3/32; C08K 5/05; C08K 5/11

[52] U.S. Cl. ..... 524/382; 524/140; 524/141; 524/398; 524/417; 524/605; 523/100

[58] Field of Search ..... 523/100; 524/127, 381, 524/382, 605

[56] References Cited

U.S. PATENT DOCUMENTS

| | | | |
|---|---|---|---|
| 2,641,592 | 6/1953 | Hofrichter, Jr. | 528/309 |
| 3,907,754 | 9/1975 | Tershansy et al. | 528/286 |
| 3,951,905 | 4/1976 | Sano et al. | 524/399 |
| 3,962,189 | 6/1976 | Russin et al. | 528/277 |
| 4,001,187 | 1/1977 | Itabashi et al. | 528/274 |
| 4,010,145 | 3/1977 | Russin et al. | 528/280 |
| 4,020,049 | 4/1977 | Rinehart | 560/94 |
| 4,082,724 | 4/1978 | Hewerston | 524/129 |
| 4,250,078 | 2/1981 | McFarlane et al. | 524/105 |

FOREIGN PATENT DOCUMENTS

| | | |
|---|---|---|
| 53-51295 | 5/1978 | Japan . |
| 55-15424 | 2/1980 | Japan . |
| 55-40714 | 3/1980 | Japan . |

OTHER PUBLICATIONS

Kamatani et al., "Effect of Phosphoric Acid on the Polycondensation of Bis(2-hydroxyethyl) Terephthalate Catalyzed by Sb(III) Compounds", Polymer Journal, vol. 12, No. 2, pp. 125-130, (1980).

Unitika Co., Plasdoc 31808 V/17, Derwent Publications, 4/1/74.

*Primary Examiner*—Lewis T. Jacobs
*Assistant Examiner*—Robert E. L. Sellers, II
*Attorney, Agent, or Firm*—Alvin T. Rockhill

[57] ABSTRACT

A polyester which when made into an article such as films, containers, bottles and the like has a very high clarity, a low haze value, and a neutral hue. In the preparation of the resin, an antimony catalyst is utilized along with small amounts of a bluing agent such as a cobalt compound and a phosphate compound with the phosphate compound generally being slightly in excess of an equivalent amount of the cobalt compound. The polyester is made from dicarboxylic acids and preferably aromatic acids such as terephthalic acid reacted with polyhydric alcohols.

26 Claims, No Drawings

HIGH CLARITY COLORLESS POLYESTERS

Matter enclosed in heavy brackets [ ] appears in the original patent but forms no part of this reissue specification; matter printed in italics indicates the additions made by reissue.

CROSS-REFERENCE

This is a continuation application of application Ser. No. 245,838, filed Mar. 20, 1981.

TECHNICAL FIELD

The present invention relates to a polyester which has a high clarity, and is transparent when made into an article. The article has a neutral color hue, a low haze value, and no greyness therein.

BACKGROUND ART

Heretofore, numerous compounds and catalysts have been used for the preparation of polyester resins. However, high clarity, neutral hue, and low haze polyester articles such as films, sheets, containers, and the like are desirable, especially for containing food or drink, or when replacing glass. Often, antimony has been used as a catalyst, at times in combination with a phosphite compound. However, the reaction between these two compounds would often result in some amount of antimony metal being formed which imparted a gray color to the resin and article formed therefrom. Moreover, if other catalysts were utilized, a high level of acetaldehyde was produced which is highly undesirable for use in connection with food containers.

U.S. Pat. No 3,795,639 to Chimura, et al relates to a process for preparing linear polyesters wherein the polycondensation of glycol terephthalate is preformed in the presence of (1) an antimony catalyst, (2) a germanium compound and (3) a phosphoric ester. This patent is not pertinent in that it does not utilize a bluing agent and does utilize a germanium compound.

U.S. Pat. No. 3,732,182, to Chimura, et al is not pertinent in that it relates to a novel antimony compound having the formula $Sb(OR_1)(OR_2)(OR_3)$.

U.S. Pat. No. 3,965,071 to McClelland relates to the preparation of polyesters in the presence of a titanium compound, the deactivation of a catalyst by reaction with phosphoric acid or ester and polycondensation in the presence of an antimony compound. Thus this patent relates to a completely different catalyst system as well as to a deactivation of the titanium catalyst.

U.S. Pat. No. 3,842,043 relates to a white, transparent polyester utilizing a polycondensation catalyst solution containing germanium dioxide, glycol and a solubilizing agent such as calcium, magnesium, strontium and zinc metals or salts thereof. Hence, it is not pertinent.

U.S. Pat. No. 4,082,724 to Hewertson relates to polyesters containing a trihalide or a tri(pseudohalide) of antimony and an organic oxo compound of phosphorus. The mole ratio of the oxo phosphorus compound to antimony is generally in excess of 1.0. This patent is not pertinent in that it uses very high amounts of phosphorus compounds and does not utilize a bluing agent.

An article of Unitika Co., Plasdoc 31808 V/17 Dewent Publications (April 1, 1974), obtains a polyester by polymerizing a bis(W-hydroxalkyl)terephthalate and/or its oligomer in the presence of an antimony compound, a cobalt compound, and a halide phosphate compound. This article is not pertinent in that a halide phosphate compound is utilized and relates to making polyesters from dimethyl terephthalate.

U.S. Pat. Nos. 3,962,189 to Russin et al, 3,907,754 to Tershansy et al, and 4,010,145 to Russin et al are all very similar in that they relate to catalyst inhibitor systems having a combination of organic or inorganic salts of manganese and cobalt, titanium compounds, antimony compounds, and a phosphate ester. The amount by weight of phosphorus is greater than the total weight of cobalt, manganese, and titanium. Moreover, the examples generally show the amount of phosphorus being at least four times as much as the amount of cobalt. Thus, these references are not pertinent in that they use very high amounts of phosphate in comparison to the other metals, as well as use other components not utilized by the present invention. Moreover, they relate to making a polyester from dimethyl terephthalate and not from dicarboxylic acids.

U.S. Pat. No. 2,641,592, to Hofrichter, relates to a cobalt acetate catalyst in association with antimony for the polymerization of dimethyl terephthalate. This patent is not pertinent in that it lacks any suggestion utilizing any phosphate compound. Additionally, such a composition would yield unacceptably high acetaldehyde levels in containers made therefrom.

U.S. Pat. No. 3,028,366 to Engel et al relates to phosphate modifiers in association with antimony catalysts to produce colorless or white polyesters from dimethyl terephthalate. In passing, the patent states that other well known catalysts or catalyst combinations can also be utilized including various metals such as calcium, magnesium, lanthanum, manganese, and cobalt. Since such compounds are utilized as catalysts, high amounts thereof are required. This patent is not pertinent in that it fails to specifically teach applicant's use of a bluing agent, very small amounts of phosphate in comparison with any bluing agent as well as small amounts of the bluing agent, and relates only to the use of dimethyl terephthalate.

The above patents and articles all generally relate to the utilization of dimethyl terephthalate in preparing the polyester. Whenever various catalysts are utilized such as manganese, cobalt and the like, relatively high amounts, that is generally in excess of 70 parts per million by weight of the element must be utilized. Such compounds necessarily impart a color to the polyester, for example a blue color, and hence are inherently incapable of producing a neutral hue polyester artile, that is a colorless or transparent article, with low acetaldehyde content and generation rate.

DISCLOSURE OF INVENTION

It is therefore an object of the present invention to provide a polyester which yields a high clarity, neutral hue, low haze article.

It is yet another object of the present invention to provide a polyester which yields a high clarity, neutral hue, low haze article, as above, wherein an antimony catalyst, a phosphate compound and a bluing agent are utilized to produce the polyester.

It is yet another object of the present invention to provide a polyester which yields a high clarity, neutral hue, low haze article, as above, wherein said bluing agent is a cobalt compound.

It is yet another object of the present invention to provide a polyester which yields a high clarity, neutral hue, low haze article, as above, wherein said polyester is made from aryl dicarboxylic acids and polyhydric alcohols.

It is yet another object of the present invention to provide a polyester which yields a high clarity, neutral hue, low haze article, as above, wherein the amount of elemental cobalt compound ranges from about 5 parts to about 50 parts per million of polymer, wherein the amount of elemental phosphorus ranges from about 5 to about 60 parts per million of polymer and wherein the amount of elemental antimony ranges from about 70 to about 250 parts per million of polymer.

It is yet another object of the present invention to provide a polyester whith yields a high clarity, neutral hue, low haze article, as above, wherein the polyester is particularly suitable for containers, especially for food containers and particularly bottles, and has low acetaldehyde levels.

It is yet another object of the present invention to provide a polyester which yields a high clarity, neutral hue, low haze article, as above, wherein a slight molar excess of phosphorus is utilized as compared to the cobalt.

It is yet another object of the present invention to provide a polyester which yields a high clarity, neutral hue, low haze article, as above, wherein the amount of phosphorus ranges from about 0.35 to about 2.5 parts by weight per one part of elemental cobalt.

It is yet another object of the present invention to provide a polyester whith yields a high clarity, neutral hue, low haze article, as above, wherein the cobalt is added to the polymerization process before the antimony is added.

These and other objects of the present invention will become apparent from the following description of the invention.

Generally, a polyester which yields a high clarity, low haze, neutral hue article comprises: the polyester containing from about 70 to about 250 parts by weight of elemental antimony per 1 million parts of said polyester; a low amount by weight of a phosphorus compound and a bluing agent, the amount of said phosphorus compound ranging from about 0.35 to 2.5 parts by weight for each part by weight of a metal in said bluing agent.

Generally, the process for making a polyester article having a high clarity, low haze, neutral hue comprises the steps of: preparing a polyester resin, adding a small amount of phosphorus and a bluing agent, wherein the amount of phosphorus to metal in said bluing agent ranges from about 0.35 to about 2.5 parts by weight, and adding from about 70 to about 250 parts by weight of elemental antimony in the form of an antimony compound to said polyester during the preparation thereof.

BEST MODE FOR CARRYING OUT THE INVENTION

High clarity polyesters are produced utilizing an antimony catalyst and low amounts of phosphorus and a bluing agent. By the term "bluing agent" as utilized in the present invention, it is meant any compound which upon addition to the polymer during preparation thereof will act as a blue colored compound or pigment and neutralize any otherwise yellow color in the polyester formed to yield a transparent, colorless or neutral hue article. In other words, the bluing agent, although often a blue colored compound, can be a red compound such as cobalt acetate, a green compound, or the like, which upon addition to the polymerization process reacts and forms a blue colored compound which neutralizes yellow and forms a transparent polyester when made into an article. The polyesters when made into articles have very high clarity, neutral hue, low haze, and low acetaldehyde levels and thus are suitable as films, sheets, or in any other form when a bright high clarity with low haze is desired. Particularly suited articles include containers, especially for foods, and bottles.

The polyester resin is produced in a conventional manner but only from the reaction of dicarboxylic acids having from from 2 to about 16 carbon atoms with polyhydric alcohols such as glycols or diols containing from 2 to about 12 carbon atoms. The alkyl dicarboxylic acids may contain a total of from 2 to 16 carbon atoms. Preferably, the acids are aryl or an alkyl substituted aryl acid containing from 8 to 16 carbon atoms. Specific examples of linear or alkyl dicarboxylic acids include oxalic acid, malonic acid, succinic acid, glutaric acid, adipic acid, pimelic acid, suberic acid, azelaic acid, sebacic acid, and the like. Specific examples of an aryl acid include the various isomers of phthalic acid, such as paraphthalic acid (terephthalic acid) and naphthalic acid. Specific examples of alkyl substituted aryl acids include the various isomers of dimethylphthalic acid such as dimethylisophthalic acid, dimethylorthophthalic acid, dimethylterephthalic acid, the various isomers of diethylphthalic acid such as diethylisophthalic acid, diethylorthophthalic acid, diethylterephthalic acid, the various isomers of dimethylnaphthalic acid such as 2,6-dimethylnaphthalic acid and 2,5-dimethylnaphthalic acid, and the various isomers of diethylnaphthalic acid. Generally, terephthalic acid is highly preferred.

Polyesters made from diesters such as dimethylterephthalate do not form any part of the present invention. When such a monomer is utilized, high amounts of catalyst, that is generally the 70 parts per million of the elemental catalyst, are required in order to promote the esterification and condensation reactions. Such amounts of catalyst are in excess of the present invention and will impart a color to the polyester and articles formed therefrom. The present invention completely avoids any color hue by utilizing the dicarboxylic acids and hence, utilizes low amounts of cobalt, that is generally less than 50 parts per million, and desirably less than 30 parts per million.

The diols or glycols may be straight chained or branched. Specific examples include ethylene glycol, propylene glycol, trimethylene glycol, 1,2-butane diol, 1,3-butane diol, 1,4-butane diol, 2,3-butane diol, neopentyl glycol, and the like. Of the various glycols, those having from 2 to 8 carbon atoms are preferred with ethylene glycol and 1,4-butane diole being highly preferred. In lieu of the various glycols, another class of polyhydric alcohols, such as the glycol ethers containing from 4 to 12 carbon atoms, can be utilized as for example dimethylene glycol and 1,4-dihydroxyethoxy benzene.

The polyesters can be made according to melt polymerization, or melt and solid state polymerization. As known to those skilled in the art, polyesters are generally made in two stages. In the first stage or esterification stage, the diacid is reacted with the diol at elevated temperatures and pressures with water being produced. In the second stage or the polycondensation stage, a vacuum is gradually applied, or generally catalysts are utilized, and water and a diol are withdrawn as a condensation product. Various polyesters can be made by such a polymerization including polyethyleneterephthalate, a preferred polyester resin. Moreover, the process may be modified slightly by reacting the dicarboxylic acid with the diol in a solvent which is a low molecular weight linear polyester in a manner as set forth in U.S. Pat. No. 4,020,049 to Rinehart which is hereby fully incorporated with regard to the method of making the polyester resin. That is, the dicarboxylic acid and the glycol added in a molar ratio of the glycol to the acid of from 1.7:1 to 1.05:1 to a solvent consisting of a preformed low molecular weight condensation polyester of a glycol and a dicarboxylic acid, the polyester having an average degree of polymerization of from 1.4 to 10. The mixture is then heated and reacted at a temperature at least from above the melting temperature of the low molecular weight linear polyester to a temperature of 300° C. with the pressure being from about 20 to about 1,000 pounds per square inch gauge. The reaction is continued until a linear condensation polyester resin made from said glycol and said acid, having an average degree of polymerization of from 1.4 to 10, is produced. The condensation or polymerization reaction is carried out until a linear polyester is formed at elevated temperature under reduced pressure, that is approximately 10 millimeters or less of mercury. The condensation reaction temperature is from about 260° to about 290° C. Regardless of the exact process, such reactions can be carried out in situ.

Solid state polymerization can also be utilized. In this process, the polycondensation reaction is carried out until generally the intrinsic viscosity of the polymer melt reaches about 0.20 or higher, for example, up to about 0.80. At this point, the solution melt is cooled to produce a solid which is then pelletized, chopped, etc. The pellets are then subjected to a solid state polymerization wherein the vacuum is applied at a temperature below the melting point of the partially formed polymer. Alternatively, the polymerization can be accomplished by removal of the by-product, e.g. water, ethylene glycol, by circulating or blowing an inert gas through the pellets. Thus, the polymer is actually polymerized in a solid state, with the polycondensation reaction being conducted in such a state. Generally, the solid state polymerization is continued until the intrinsic viscosity reaches any desirable level, such as from about 0.60 to about 1.0, or even higher. That is, at times it is desirable to produce very high molecular weight polyesters, for example, a polyester having an intrinsic viscosity of from about 1.0 to about 1.2. Desirably, the intrinsic viscosity ranges from about 0.70 to about 0.85 and preferably from about 0.70 to about 0.80. By intrinsic viscosity it is meant that the value obtained when $n_{specific}/C$ or LOG $r_{rel.}/C$ is extrapolated to zero concentration; where the relative viscosity is defined as the quotient of the solution viscosity, $n_{soln.}$ and the viscosity of the solvent $n_{solv.}$, i.e., $n_{rel.}=n_{soln.}/n_{solv.}$ The specific viscosity $n_{sp.}=n_{rel.}-1$. The units are deciliters/gram using a 60/40 phenol/tetrachloroethane at 25° C. The symbol n is for the Greek letter eta.

When the polyester resin is intended for use in contact with food only those polyesters which are regulated by the Federal Food and Drug Administration should be utilized, such as set forth in Title 21, §177.1630, for example, the polyethylenephthalate polymers, and such polysters are preferred in the present invention.

The antimony catalyst utilized in the present invention can be generally any trivalent organic antimony compound known to the art. Examples of specific antimony compounds include antimony triacetate, antimony trioxide, antimony glycolate (either formed separately or during polymerization), and the like, with antimony glycolate being preferred. The antimony compound desirably is added to the condensation stage or step of the polymerization.

The present invention also relates to the use of relatively low amounts of a phosphorus compound, for example a phosphate, and a bluing agent in comparison to the weight or amount of the antimony catalyst. The term "phosphate" as utilized in the present invention includes various phosphate compounds known in the art as well as phosphoric acid. The bluing agents are generally cobalt compounds which may or may not initially be blue as previously discussed. The polyester resins of the present invention can be made to form various articles such as films, sheets, containers, and the like. The some of these applications wherein the polyester is utilized as a container, for example, for containing carbonated beverages, it is highly desirable to maintain or to have low acetaldehyde levels to prevent discernible differences in taste. For example, the addition of levels of acetaldehyde as low as 60 parts per billion by weight have altered the tastes of carbonated cola beverages. Other food stuffs have different taste threshold levels which may be exceeded if the acetaldehyde level is not minimized. Desirably, when a container is utilized to contain food stuffs or liquids such as beverages, the amount of acetaldehyde diffusing from the container walls (e.g., a 2 liter bottle) of an empty, freshly blown bottle is less than 3 micrograms per liter. This test is conducted by maintaining the container at 70° F. for twenty-four hours, and then testing the gases content therein to determine the amount by weight of acetaldehyde. Generally it has been found that wherein the acetaldehyde content is less than 3 micrograms per liter of volume in a container within twenty-four hours after preparation thereof, any remaining accumulation of acetaldehyde is low and presents no discernible taste in a beverage, food stuff, or the like with longer periods of storage.

Since cobalt compounds have been shown to increase the acetaldehyde level in a container, an amount of a phosphate compound (including phosphoric acid) is utilized to suppress the catalytic activity of the cobalt compound. Generally, one part by weight of elemental cobalt requires approximately 0.35 parts by weight of elemental phosphorus. Preferably, a slight excess of the phosphorus compound is utilized to insure suppression of the catalytic influence of the cobalt compound on acetaldehyde production. Thus, according to the present invention, from about 0.35 to about 2.5 parts by weight and preferably from about 0.4 to about 0.6 parts by weight of elemental phosphorus is desired for every one part of elemental cobalt. Should a greater amount be utilized, free phosphate will generally exist which will react with the antimony to produce an antimony phosphate type compound and if sufficient amounts exist in excess of the solubility limit of such a compound, will form particles and/or nucleation of crystallinity upon formation of the polyester. This results in a hazed article.

The present invention as noted above relates to the article when formed from a polyester resin has low haze, a neutral color, and high clarity. If a bluing agent is not utilized, the resulting polymer produced would generally not have the neutral hue in that it would have an undesirable yellowish tinge or color.

Desirably, from about 70 to about 250 parts by weight per million of elemental antimony is desired based upon the produced polyester resin with the preferred range being from about 120 to about 210 parts per million. The amount of cobalt ranges from about 5 parts to about 50 parts by weight per million, desirably from about 5 to about 30 parts, and preferably from about 8 parts to about 20 parts per million. The amount of the phosphate compound expressed in terms of elemental phosphorus per million parts of polyester polymer ranges from about 5 to about 60 parts, desirably from about 10 to about 50 parts, and preferably from about 8 to about 20 parts by weight. Typical cobalt coloring agents include cobalt acetate tetrahydrate, cobalt aluminate, cobalt benzoate, cobalt chloride, and the like with cobalt acetate being preferred. Examples of typical phosphate compounds include any pentavalent phosphates such as phosphoric acid, trialkylphosphates, for example, trimethylphosphate, triethylphosphate, tripentylphosphate, and the like. Triaryl phosphates such as triphenyl phosphate, triaryl phosphate, and the like can also be utilized. Additionally, mono and dialkyl/aryl phosphates may be utilized. Phosphoric acid and the trialkyl phosphates are preferred.

Desirably, the phosphate and the cobalt compounds are added before the antimony addition, and preferably during the beginning of the esterification stage although they can be added at the beginning of the condensation stage. The preparation of the polyester resin can be conducted in any conventional manner utilizing a dicarboxylic acid. That is, conventional temperatures, pressures, reaction times, and the like are utilized as well known to those skilled in the art.

The articles made from polyester resins of the present invention exhibit very high clarity, low haze values, and neutral hue. The haze value is generally indicated by a haze number according to the Hunter haze test. The haze number is generally less than 3.0, desirably less than 2.5, and preferably less than 2.0. Often, haze values are measured by eyesight since they tend to be more accurate than the Hunter values. The neutral hue is generally indicated by utilizing a Hunter Lab instrument. Generally, the hue is neutral as indicated by an "a" coordinate value ranging from about −1.0 to about 1.0, and preferably from about −0.5 to about 1.0, and a "b" coordinate value ranging from about −2.0 to about 2.0, and preferably from about −0.5 to about 2.0. That is, the numbers are basically on the zero-zero coordinates which indicates that the resulting article, for example a beverage bottle has no color.

The invention will be better understood by reference to the following examples.

POLYESTER REACTOR PROCESSING EXAMPLE

The poly(ethylene terephthalate) polyesters described in Table III were prepared in a 200 pound polyester process reactor. The materials charged to the reactor, identification, amounts and points of addition, are shown in Table IA. The processing conditions and procedures for the esterification (S/1) reaction are shown in Table IB, and the same for the polycondensation (S/2 and S/3) reactions are shown in Table IC.

TABLE I

Polyester Reactor Processing
0.60 ± 0.02 I.V. Feed Polymer

A. Raw Materials

| Raw Material | % | S/ | Amount (lbs.) | Amount (gms.) | Active Element. | ppt |
|---|---|---|---|---|---|---|
| Terephthalic acid (TPA) | 100 | 1 | 129.0 | — | — | — |
| Ethylene glycol (EG) | 100 | 1 | 50.7 | — | — | — |
| $H_3PO_4$:EG[a] | — | 1 | — | 102.1 | P | 0.015 |
| $Co(C_2H_3O_2)_2.4H_2O$:EG[a] | — | 2 | — | 215.3 | Co | 0.015 |
| $Sb_2O_3$:EG[b] | — | 2 | — | 285.5 | Sb | 0.130 |
| Ethylene glycol makeup | — | 2 | 16.8 | — | — | — |

B. Esterification (S/1) Reaction Conditions and Procedures

| Elasped Time (Min.) | Batch Temp., °C. | Oil Temp., °C. | Pressure PSI | Head Temp., °C. | Procedure |
|---|---|---|---|---|---|
| 0 | 260 | 267 | 10 | 108 | charge TPA |
| 5 | 226 | 257 | 40 | 107 | charge $H_3PO_4$:EG, EG |
| 48 | 256 | 283 | 70 | 129 | |
| 60 | 260 | 288 | 70 | 130 | start temp. program |
| 135 | 284 | 291 | 10 | 108 | transfer to S/2 vessel |

C. Polycondensation (S/2 and S/3) Reaction Conditions and Procedures

| | Elasped Time (Min.) | Batch Temp., °C. | Oil Temp., °C. | Pressure mm of Hg | Agitator RPM | Procedure |
|---|---|---|---|---|---|---|
| S/2 | 142 | 280 | 285 | Atm. | — | charge $Co(C_2H_3O_2)_2.4\ H_2O$:EG |
| | 147 | 262 | 285 | Atm. | — | charge $Sb_2O_3$:EG, start vacuum |
| | 152 | 274 | 285 | 100 | — | |
| | 193 | 275 | 286 | 2.5 | — | transfer to S/3 vessel |
| S/3 | 196 | 273 | 283 | 300 | 73 | |
| | 208 | 281 | 286 | 0.30 | 66 | |
| | 242 | 283 | 286 | 0.15 | 30 | cut vacuum and pressurize to 8 PSI to extrude resin ribbon that is diced into ⅛ inch cubes. |
| | 260 | | | | | end of dicing |

[a]Raw materials dissolved in ethylene glycol
[b]$Sb_2O_3$ reacted with EG to yield Sb glycolate
The 0.60 ± 0.021 I.V. feed resin is subsequently solid state polymerized to 0.72 ± 0.02 IV in a 3 $ft^3$ blender-dryer reaction vessel using conditions and procedures outlined in Table II.

TABLE II

| Polyester Solid State Polymerization 3 ft³ Blender-Dryer 0.72 ± 0.02 I.V. | | | |
|---|---|---|---|
| Elasped Time (hrs.) | Oil Temp., °C. | Batch Temp., °C. | Procedure |
| 0 | 190 | — | Charge 100 pounds of feed resin |
| 1.5 | 190 | 150 | Crystallize at atm. pressure |
| 8.0 | 237 | 226 | Solid state polymerize at 0.2-.3 mm of Hg vac. |
| 10.0 | — | — | Cool resin temp. to 40-50° C. and discharge |

a reduced brightness. However, Examples IV and V have a neutral color as well as good brightness. Concerning the preform properties, that is an item made from a resin such as a parison, the prior art article has reduced brightness; Example II has a yellow color; and Example III has a reduced brightness. However, Example IV and V have good brightness and therefore clarity and a neutral hue. Examining now the bottle properties which are taken through the sidewall, it is seen that Example I does show a fair amount of haze. The visual inspection also reveals that the bottle is hazy and has reduced brightness. Although Examples II and III show clear Hunter sidewall values, the visual inspection reveals that the neck and bottom which tend to be thicker are yellow and blue, respectively. Thus, they do not contain a neutral hue. Moreover, Example III which contains the cobalt, has an unacceptable amount of acetaldehyde content. In contrast, Examples IV and V, both through the instrument readings and visual readings, have clear bottles including the neck and bottom portion and have no haze. The clarity is high and the acetaldehyde levels are low. Thus, it is apparent that the present invention yields a high clarity bright bottle having low haze and a neutral or no color thereto.

TABLE III

Improved Appearance PET Properties

| Sample | Composition, ppm Sb | Co | P | I.V., dl/gm | COOH$^{Eq}$/10$^6$ gms | Mettler M.P., °C. | Gardner Color Rd | a | b | $CH_3CHO$ Content, ppm |
|---|---|---|---|---|---|---|---|---|---|---|
| | | | | Feed Resin Properties | | | | | | |
| 1 | 210 | — | 25* | 0.606 | 17 | 255.1 | 24.0 | −0.5 | 2.4 | 51.5 |
| 2 | 150 | — | — | 0.568 | 22 | 255.8 | 40.0 | −1.2 | 8.9 | 56.9 |
| 3 | 150 | 50 | — | 0.561 | 27 | 256.0 | 20.9 | 5.4 | −8.5 | 80.7 |
| 4 | 150 | 50 | 40 | 0.574 | 14 | 255.5 | 32.1 | −0.1 | −0.3 | 51.9 |
| 5 | 130 | 15 | 15 | 0.572 | 17 | 254.4 | 30.7 | 0.6 | 0.1 | 52.0 |
| | | | | Solid State Resin Properties | | | | | | |
| 1 | Same as Above | | | 0.709 | 12 | — | 53.4 | −2.0 | 0.0 | 1.6 |
| 2 | " | | | 0.715 | 15 | — | 73.1 | −2.4 | 11.9 | 1.1 |
| 3 | " | | | 0.713 | 18 | — | 48.3 | 1.5 | −6.1 | 1.7 |
| 4 | " | | | 0.747 | 9 | — | 61.0 | −1.4 | −1.3 | 1.2 |
| 5 | " | | | 0.716 | 12 | — | 66.3 | −1.4 | −1.1 | 1.4 |
| | | | | $CH_3CHO$ Generation Rate (ppm/min.) | | | | | | |
| 1 | Same as Above | | | | | 1.12 | | | | |
| 2 | " | | | | | 1.13 | | | | |
| 3 | " | | | | | 3.36 | | | | |
| 4 | " | | | | | 1.23 | | | | |
| 5 | " | | | | | 1.16 | | | | |

BOTTLE PREFORM PROPERTIES

| | | Hunter Values L | (a) | (b) |
|---|---|---|---|---|
| 1 | Same as Above | 56.2 | −2.1 | 3.6 |
| 2 | " | 71.4 | −2.8 | 7.1 |
| 3 | " | 64.3 | 1.0 | 0.8 |
| 4 | " | 68.7 | 0.8 | 2.2 |
| 5 | " | 71.8 | 1.0 | 2.0 |

| Sample | Composition, ppm Sb | Co | P | Bottle Properties (2 Liter) Hunter L | Sidewall a | b | Haze | Headspace $CH_3CHO$ Content Visual | μg/l (ppb) |
|---|---|---|---|---|---|---|---|---|---|
| 1 | 210 | — | 25* | 86.9 | −0.8 | 1.7 | 3.4 | Bottle hazy and reduced brightness | 2.2 |
| 2 | 150 | — | — | 88.7 | −0.8 | 1.9 | 1.7 | Yellow neck and bottom | 2.6 |
| 3 | 150 | 50 | — | 88.2 | 0.0 | 1.3 | 1.7 | Bluish tinge neck and bottom | 10.2 |
| 4 | 150 | 50 | 40 | 88.0 | +0.2 | 1.4 | 3.6 | Clear neck and bottom | 2.0 |
| 5 | 130 | 15 | 15 | 88.9 | −0.2 | 1.3 | 1.7 | Clear neck and bottom | 2.1 |

*Phosphite

As previously noted, the present invention relates to a polyester which produces an article having a high clarity, a low haze, and neutral hue. Examining Table III, the data sets forth clarity, haze values, and color values, that is neutral hue; with regard to Example I, a prior art polyester containing antimony and a phosphite; Example II relates to a polyester produced merely containing antimony; Example III relates to a polyester produced containing only antimony and cobalt; whereas Examples IV and V relate to the present invention. As apparent from the various data such as the feed resins and solid state resin properties, the prior art resin has a reduced brightness value. Example II has yellow resin, whereas Example III has bluish resin and While having described the best mode as well as the preferred embodiment of the present invention, in accordance with the patent statutes, it is noted that the invention is not limited thereto, the scope of the invention being measured by the attached claims.

What is claimed is:

[1. A polyester, comprising:

a polyester resin, said polyester resin made solely by adding a dicarboxylic acid to a glycol compound in a molar ratio of said alcohol to said acid of from 1.7:1 to 1.05:1, said dicarboxylic acid selected from the group consisting of alkyl dicarboxylic acids having a total of from 2 to 16 carbon atoms, aryl or alkyl substituted aryl dicarboxylic acids containing a total of from 8 to 16 carbon atoms, and combinations thereof, and wherein said glycol is selected from the group consisting of glycols having from 2 to 12 carbon atoms, glycol ethers having from 4 to 12 carbon atoms, and combinations thereof, forming a mixture by adding a phosphorus compound, a cobalt compound as well as said alcohol and said acid to a solvent consisting of a preformed molecular weight linear condensation polyester of a glycol and a dicarboxylic acid, said polyester having an average degree of polymerization of from 1.4 to 10, heating and reacting the mixture at a temperature from above the melting temperature of a low molecular weight linear polyester to 300° C. at a pressure of from about 20 to about 1000 pounds per square inch gauge pressure until a linear condensation polyester resin of said glycol and acid having an average degree of polymerization of from 1.4 to 10 is formed, adding a condensation antimony polymerization catalyst and then heating and reacting the mixture at a temperature of from about 260° C. to about 290° C. at a pressure of about ten millimeter of mercury or less until a linear polyester is formed, said polyester consisting essentially of said antimony compound, said phosphorus compound, and said cobalt compound, the amount of said antimony compound, based upon the amount of elemental antimony therein, ranging from about 70 to about 250 parts by weight per one million parts by weight of said polyester, the amount of said phosphorus compound, based upon the amount of elemental phosphorus therein, ranging from about 5 to about 60 parts by weight per million parts by weight of said polyester, the amount of said cobalt compound based upon the amount of elemental cobalt therein ranging from about 5 to about 50 parts by weight per million parts by weight of said polyester, the amount of said elemental phosphorus in said phosphorus compound ranging from about 0.35 to about 2.5 parts by weight for each part by weight of elemental cobalt in said cobalt compound, said polyster resin yielding a high clarity, low haze, neutral hue article having a haze value of less than 3.0.]

[2. A polyester according to claim 1, wherein said phosphorus compound is a phosphate.]

[3. A polyester according to claim 2, having a haze value of less than 2.5, wherein the amount of elemental cobalt in said cobalt compound ranges from about 5 to about 30 parts by weight per million parts by weight of said polyester, wherein the amount of said elemental phosphorus in said phosphorus compound ranges from about 10 to about 50 parts by weight per million parts by weight of said polyester, and wherein the ratio of said elemental phosphorus to said elemental cobalt ranges from about 0.4 to about 1.3 parts by weight.]

[4. A polyester according to claim 3, wherein said neutral hue, high clarity, low haze article consists essentially of said polyester resin, said antimony compound, said phosphorus compound, and said cobalt compound.]

[5. A polyester according to claim 4, wherein said cobalt compound is cobalt acetate, wherein said phosphorus compound is phosphoric acid, and wherein said antimony compound is antimony glycolate.]

[6. A polyester according to claim 5, wherein said dicarboxylic acid is a terephthalic acid, and wherein said glycol is ethylene glycol, and wherein said polyester has a Hunter "a" coordinate value of from about minus 1.0 to about 1.0 and a "b" coordinate value of from about minus 2.0 to about 2.0.]

[7. A polyester according to claim 3, wherein said polyester is in the form of a container.]

[8. A polyester according to claim 6, wherein said polyester is in the form of a container and wherein the amount of elemental antimony in said antimony compound ranges from about 120 to about 210 parts of antimony per million parts by weight of said polyester, and wherein the amount of said elemental cobalt in said cobalt compound ranges from about 8 to about 20 parts by weight per million parts by weight of said polyester.]

[9. A polyester according to claim 7, wherein said container is a bottle.]

10. A process for making a polyester, *which is suitable for utilization in making articles having high clarity, low haze and neutral hue,* comprising the steps of:

preparing a [polyester resin,] *preformed low molecular weight linear condensation polyester*, said [polyester resin] *preformed low molecular weight linear condensation polyester* made solely by [adding ] *reacting* a dicarboxylic acid [to] *with* a glycol compound [in a molar ratio of said glycol to said acid of from 1.7:1 to 1.05:1, said dicarboxylic acid selected from the group consisting of alkyl dicarboxylic acids having a total of from 2 to 16 carbon atoms, aryl or alkyl substituted aryl dicarboxylic acids containing a total of from 8 to 16 carbon atoms, and combinations thereof, and wherein said glycol is selected from the group consisting of glycols having from 2 to 12 carbon atoms, glycol ethers having from 4 to 12 carbon atoms, and combinations thereof];

forming a mixture by adding [said glycol and said] *a glycol and a dicarboxylic* acid *in a molar ratio of said glycol to said acid of from 1.7:1 to 1.05:1, said acid selected from the group consisting of alkyl dicarboxylic acids having a total of from 2 to 16 carbon atoms, aryl or alkyl substituted aryl dicarboxylic acids containing a total of from 8 to 16 carbon atoms, and combinations therefor, and wherein said glycol is selected from the group consisting of glycols having from 2 to 12 carbon atoms, glycol ethers having from 4 to 12 carbon atoms, and combinations thereof* to a solvent consisting of [a] *said* preformed low molecular weight linear condensation [polyester of a glycol and a dicarboxylic acid], said *preformed low molecular weight linear condensation* polyester having an average degree of polymerization of from 1.4 to 10, heating and reacting the mixture at a temperature from above the melting temperature of the *preformed* low molecular weight linear *condensation* polyester to 300° C. at a pressure of from about 20 to about 1000 pounds per square inch gauge pressure until a linear condensation polyester resin of said glycol and *said dicarboxylic* acid having an average degree of polymerization of from 1.4 to 10 is formed; [adding a condensation antimony polymerization catalyst] and then heating and reacting the mixture at a temperature of from about 260° C. to about 290° C. at a pressure of about ten millimeter of mercury or less until a linear polyester is formed;

adding during preparation of said linear condensation polyester resin compounds consisting essentially of a phosphorus compound, and a cobalt compound, adding during preparation of said linear polyester [polymer] an antimony [compound] *polymerization catalyst* the amount of said antimony [compound] *polymerization catalyst* based upon the amount of elemental antimony therein ranging from about [70 *80* parts to about 250 parts by weight per one million parts by weight of said polyester, the amount of said phosphorus compound based upon the amount of elemental phosphorus therein ranging from about 5 to about [60 *50* parts by weight per million parts by weight of said polyester, the amount of said cobalt compound based upon the amount of elemental cobalt therein ranging from about 5 to about 50 parts by weight per one million parts by weight of said polyester;

wherein the amount of elemental phosphorus in said phosphorus compound to elemental cobalt in said cobalt compound ranges from about 0.35 to about 2.5 parts by weight[; and said polyester having a haze value of less than 3.0, high clarity, and neutral hue when made into an article].

11. A process according to claim 10, including adding said cobalt compound before the step of adding said antimony compound.

12. A process according to claim 11, wherein said phosphorus compound is a phosphate[, and wherein said article has a haze value of less than 2.5].

13. A process according to claim 12 wherein the amount of elemental cobalt in said cobalt compound ranges from about 5 parts to about 30 parts per million parts of said polyester, wherein the amount of elemental phosphorus in said phosphorus compound ranges from about 10 parts to about 50 parts per million parts of said polyester, and wherein the ratio of said elemental phosphorus to said elemental cobalt ranges from about 0.4 to about 1.3 parts by weight.

14. A process according to claim 13, wherein said cobalt compound is cobalt acetate, wherein said phosphorus compound is phosphoric acid, and wherein said antimony compound is antimony glycolate.

15. A process according to claim 14, wherein said dicarboxylic acid is terephthalic acid, and wherein said glycol is ethylene glycol[, and wherein said polyester has a Hunter "a" coordinate value of from about minus 1.0 to about 1.0 and a "b" coordinate value of from about minus 2.0 to about 2.0].

16. A process according to claim 15, wherein said polyester is prepared utilizing an esterification stage and a condensation stage, and including adding said phosphorus compound at said esterification stage, and said antimony compound at said condensation stage.

17. A process according to claim 13, including forming said polyester into a container.

18. A process according to claim 16, including forming said polyester into a container, and wherein the amount of elemental antimony in said antimony compound ranges from about 120 to about 210 parts of antimony per million parts by weight of said polyester, and wherein the amount of said elemental cobalt in said cobalt compound ranges from about 8 to about 20 parts by weight per million parts by weight of said polyester.

19. A process according to claim 17, wherein said container is a bottle.

*20. The polyester made by the process specified in claim 10.*

*21. The polyester made by the process specified in claim 15.*

*22. A process according to claim 10, wherein said dicarboxylic acid is terephthalic acid, and wherein said glycol is ethylene glycol.*

*23. A process for making a polyester, comprising:*

*forming a mixture by adding a glycol and a dicarboxylic acid to a solvent consisting of a preformed low molecular weight linear condensation polyester, said preformed low molecular weight linear condensation polyester having an average degree of polymerization of from 1.4 to 10, heating and reacting the mixture at a temperature from above the melting temperature of the preformed low molecular weight linear condensation polyester to 300° C. at a pressure of from about 20 to about 1000 gauge pounds per square inch until a linear condensation polyester resin of said glycol and said dicarboxylic acid having an average degree of polymerization of from 1.4 to 10 is formed; and then heating and reacting the mixture at a temperature of from about 260° C. to about 290° C. at a pressure of about ten millimeter of mercury or less until a linear polyester is formed; wherein said dicarboxylic acid is selected from the group consisting of alkyl dicarboxylic acids containing from 2 to 16 carbon atoms, aryl or alkyl substituted aryl dicarboxylic acids containing from 8 to 16 carbon atoms, and combinations thereof; and wherein said glycol is selected from the group consisting of glycols containing from 2 to 12 carbon atoms, glycol ethers containing from 4 to 12 carbon atoms, and combinations thereof;*

*adding during preparation of said linear condensation polyester resin compounds consisting essentially of a phosphorus compound, and a cobalt compound, adding during preparation of said linear polyester an antimony polymerization catalyst the amount of said antimony polymerization catalyst based upon the amount of elemental antimony therein ranging from about 70 parts to about 250 parts by weight per one million parts by weight of said polyester, the amount of said phosphorus compound based upon the amount of elemental phosphorus therein ranging from about 5 to about 60 parts by weight per million parts by weight of said polyester, the amount of said cobalt compound based upon the amount of elemental cobalt therein ranging from about 5 to about 50 parts by weight per one million parts by weight of said polyester;*

*wherein the amount of elemental phosphorus in said phosphorus compound to elemental cobalt in said cobalt compound ranges from about 0.35 to about 2.5 parts by weight.*

*24. A process according to claim 23, including adding said cobalt compound before the step of adding said antimony compound.*

*25. A process according to claim 24, wherein said phosphorus compound is a phosphate.*

*26. A process according to claim 25 wherein the amount of elemental cobalt in said cobalt compound ranges from about* 5 parts to about 30 parts per million parts of said polyester, wherein the amount of elemental phosphorus in said phosphorus compound ranges from about 10 parts to about 50 parts per million parts of said polyester, and wherein the ratio of said elemental phosphorus to said elemental cobalt ranges from about 0.4 to about 1.3 parts by weight.

*27. A process according to claim 26, wherein said cobalt compound is cobalt acetate, wherein said phosphorus compound is phosphoric acid, and wherein said antimony compound is antimony glycolate.*

*28. A process according to claim 27, wherein said dicarboxylic acid is terephthalic acid, and wherein said glycol is ethylene glycol.*

*29. A process according to claim 28, wherein said polyester is prepared utilizing an esterification stage and a condensation stage, which further comprises adding said phosphorus compound during said esterification stage, and said antimony compound during said condensation stage.*

*30. A process according to claim 28, which further comprises forming said polyester into a container.*

*31. A process according to claim 29, which further comprises forming said polyester into a container, and wherein the amount of elemental antimony in said antimony compound ranges from about 120 to about 210 parts of antimony per million parts by weight of said polyester, and wherein the amount of said elemental cobalt in said cobalt compound ranges from about 8 to about 20 parts by weight per million parts by weight of said polyester.*

*32. A process according to claim 30, wherein said container is a bottle.*

*33. A process as specified in claim 23, wherein said dicarboxylic acid is terephthalic acid, and wherein said glycol is ethylene glycol.*

*34. The polyester made by the process specified in claim 23.*

*35. The polyester made by the process specified in claim 33.*

* * * * *